(12) United States Patent
Krawczyk

(10) Patent No.: US 6,444,070 B1
(45) Date of Patent: Sep. 3, 2002

(54) METHOD OF BUILDING A TIRE HAVING A SEGMENTED BELT

(75) Inventor: Nancy Teresa Krawczyk, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 38 days.

(21) Appl. No.: 09/725,692

(22) Filed: Nov. 29, 2000

(51) Int. Cl.[7] .................... B29D 30/38; B29D 30/46; B29D 30/70
(52) U.S. Cl. .................... 156/123; 156/130; 156/259; 156/406.4
(58) Field of Search .................... 156/130, 124, 156/406.4, 117, 123, 259, 264, 265; 152/531

(56) References Cited

U.S. PATENT DOCUMENTS

| 4,741,235 A | 5/1988 | Price |
| 4,745,957 A | 5/1988 | Sumner |
| 4,832,243 A | 5/1989 | Usami |
| 4,860,620 A | 8/1989 | Pizzorno |
| 4,934,429 A | * 6/1990 | Koseki et al. .......... 152/531 X |
| 5,252,156 A | * 10/1993 | Glinz .................. 156/130 X |
| 5,327,353 A | 7/1994 | Nagano |
| 5,795,417 A | * 8/1998 | Damke et al. ......... 156/130 X |

FOREIGN PATENT DOCUMENTS

| EP | 0 794 049 A2 | * 9/1997 | ........... 156/406.4 |
| JP | 08300511 A | * 11/1996 | ........... 156/406.4 |

* cited by examiner

*Primary Examiner*—Adrienne C. Johnstone
(74) *Attorney, Agent, or Firm*—Nancy T. Krawczyk

(57) ABSTRACT

The present invention is directed towards a method of building a tire having at least one cord reinforced belt ply. The method is comprised of layering various tire components on a tire building drum. Prior to placing the belt ply on the building drum, at least one belt ply is longitudinally cut, forming a plurality of belt ply segments. The belt ply segments are placed onto the building drum and the cords in each belt ply segment are oriented in the same direction. Also disclosed is a longitudinal cutter for dividing belt ply material into the plurality of belt ply segments. The cutter has at least a pair of shear cutters and a cutting surface against which the shear cutters rotate to cut the continuous belt ply. The shear cutters are mounted on a rail and are moveable along the length of the rail.

6 Claims, 4 Drawing Sheets

METHOD OF BUILDING A TIRE HAVING A SEGMENTED BELT

FIELD OF THE INVENTION

The disclosed invention is about a longitudinal cutter. More particularly, the present invention is directed towards a longitudinal cutter for segmenting a tire belt ply before assembling a tire comprising a segmented belt package and a method of building such a tire.

BACKGROUND OF THE INVENTION

Conventional pneumatic belted radial tires include at least two annular layers or plies of parallel cords, woven or unwoven, underlying the tread. The belt plies are arranged so that the left and right cords are inclined at angles of 15° to 30° with respect to the equatorial plane of the tire, most typically are arranged at angles between 17° and 27°.

When building tires, it is known that the various rubberized fabrics or rubberized cord material must be cut to prepare the material prior to being incorporated into the tire being built. The various uses of such cutters includes trimming the edges of the material or transversely cutting the material to the necessary length.

SUMMARY OF THE INVENTION

The present invention is directed towards a method of building a tire having at least one cord reinforced belt ply. The method is comprised of layering various tire components on a tire building drum. Prior to placing the at least one belt ply on the building drum, the at least one belt ply is longitudinally cut, forming a plurality of belt ply segments. The belt ply segments are placed onto the building drum and the cords in each belt ply segment of each belt ply are oriented in the same direction.

In another aspect of the invention, the tire being built has at least two belt plies. Both belt plies are longitudinally cut prior to placement of the belt plies on the building drum to form a plurality of belt ply segments. The cords in the belt ply segments of each belt ply are oriented in opposite directions relative to the belt ply segments of the adjacent belt plies.

Also disclosed is a longitudinal cutter for dividing a continuous belt ply into a plurality of belt ply segments. The cutter has at least a pair of shear cutters and a cutting surface against which the shear cutters rotate to cut the continuous belt ply. The shear cutters are mounted on a rail and are moveable along the length of the rail.

In another aspect of the longitudinal cutter, the cutting surface is a base plate and at least one cutting bar mounted on the base plate against which the shear cutters rotate.

In another aspect of the longitudinal cutter, the base plate forming the cutting surface has a plurality of grooves. The cutting bar have at least one tang on the base of the bar which interlocks with the grooves of the base plate to secure the cutting bar to the base plate.

BRIEF DESCRIPTION OF THE DRAWINGS

The invention will be described by way of example and with reference to the accompanying drawings in which.

For purposes of this application the various embodiments illustrated in the drawing figures each use the same reference numerals for similar components.

DETAILED DESCRIPTION OF THE PREFERRED EMBODIMENTS

Figure 1:
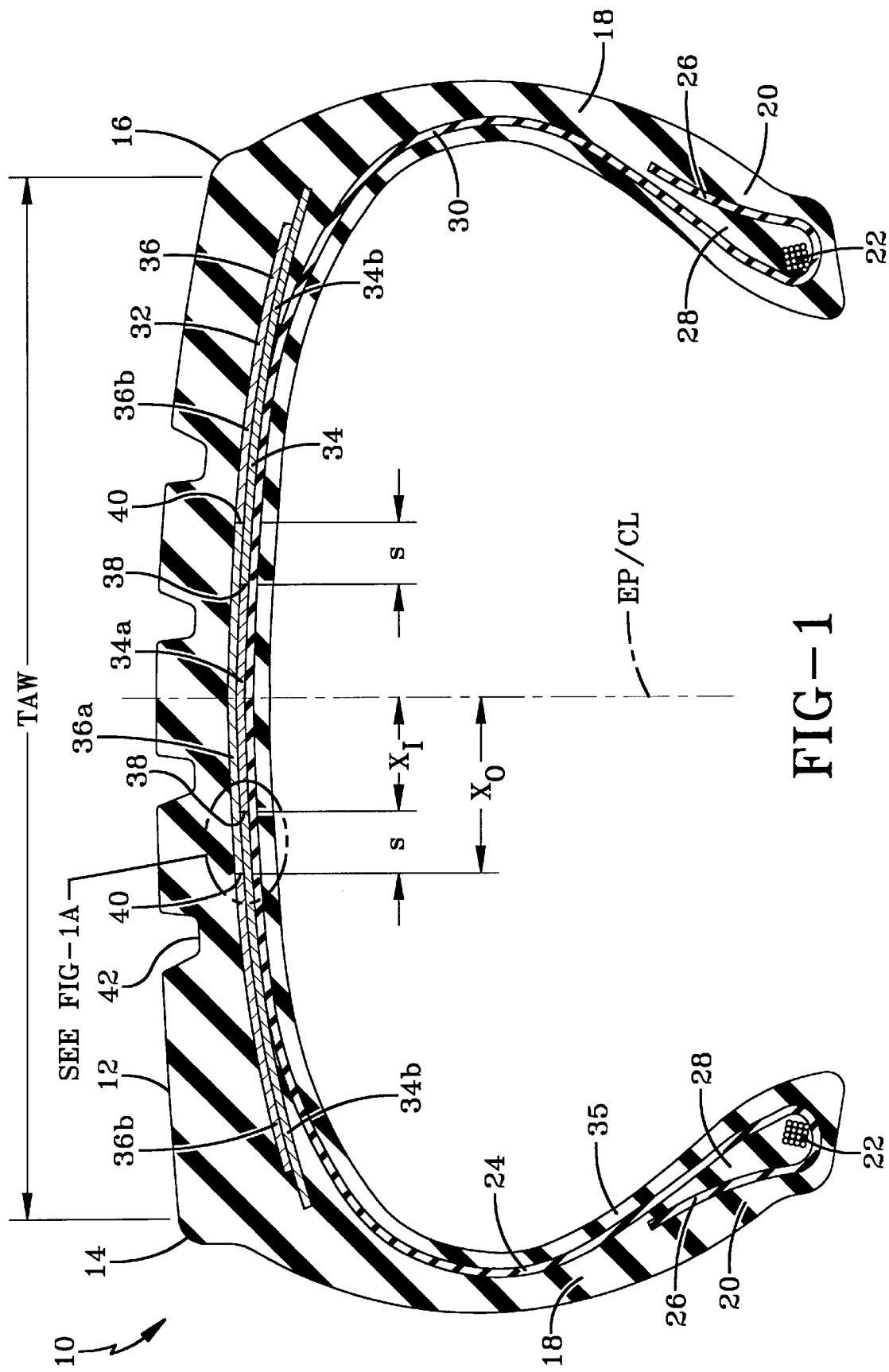
FIG. 1 is a cross-sectional view of a tire built in accordance with the present invention.

FIG. 1 illustrates a tire 10 manufactured in accordance with the disclosed invention. The tire 10 has a ground-engaging tread 12 that terminates in the shoulder segments at the lateral edges 14,16 of the tread 12 respectively. A pair of sidewall segments 18 extend from tread lateral edges 14,16 respectively and terminate in a pair of bead regions 20 each having an annular inextensible bead core 22 respectively. The tire 10 has a radial carcass 24 comprising at least one ply 30 which extends from bead region 20 through one sidewall portion 18, tread portion 12, the opposite sidewall portion 18 to bead region 20. The tire 10 preferably has the turnup ends 26 of the carcass 24 wrapped about bead cores 22. The turnup ends 26 may end at about the radial location of the maximum section width of the tire 10 or at any location desired by the tire engineer. Between the turnup ends 26 and the main structure of the carcass 24, and above the bead cores 22 is a bead apex 28. The tire 10 may include a conventional innerliner 35 forming the inner peripheral surface of the tire 10 if the tire is to be of the tubeless type. The tire 10 may also be provided with conventional bead reinforcement layers and toe guards in the bead region 20 of the tire (not illustrated).

Placed circumferentially about the radially outer surface of the carcass 24 and beneath the tread 12 is a tread reinforcing belt structure 32. The belt 32 provides lateral stiffness across the belt width to minimize lifting of the tread 12 from the road surface during operation of the tire 10. The belt structure 32 may be a single reinforcing belt ply or it may be comprised of multiple belt plies and may include cushion layers between the belt plies. In order to better illustrate certain further aspects of the invention, the illustrated belt structure 32 is formed from two cut belt plies 34, 36. Each belt ply 34, 36 is comprised of reinforcing cords of a suitable material, such as aromatic polyamide, steel, glass fiber, carbon-fiber or nylon. Within each belt ply, all the cords are substantially parallel to each other, but they are inclined at an opposed angle, with respect to the equatorial plane of the tire, to the cords in the adjacent belt ply. The cords of the radially innermost belt ply 34 make, for example, an angle of 15° to 35° with respect to the equatorial plane (EP) of the tire, whereas the cords of the radially outermost belt ply 36 extend in the diagonally opposite direction to the cords of the radially innermost belt ply, i.e. they make an angle of −15° to −35° with respect to the equatorial plane (EP) of the tire.

The belt plies 34, 36 are segmented to form at least three belt ply segments. The radially inner most belt ply 34 is divided into a central belt segment 34a and two belt edge segments 34b. The radially outer most belt ply 36 is divided into a central portion belt segment 36a and two belt edge segments 36b. The cords in each entire belt ply are inclined in a single direction. When each belt ply 34, 36 is segmented, the cords in each belt segment 34a, 34b, 36a, 36b of each belt ply 34, 36 are also inclined in the same direction. By maintaining the same cord inclination, the step of subdividing each belt ply 34, 36 into at least three belt segments decreases the stiffness of the belt plies 34, 36 across the width of the tire 10 from the tire centerline CL to the tread edges 14, 16, effectively creating hinge points 38, 40 in the respective belt plies 34, 36. Reducing the stiffness of the belt plies 34, 36 across the width of the tread in this manner reduces the strain at the edge of the belts 34, 36 and reduces the belt edge separation.

Figure 1A:
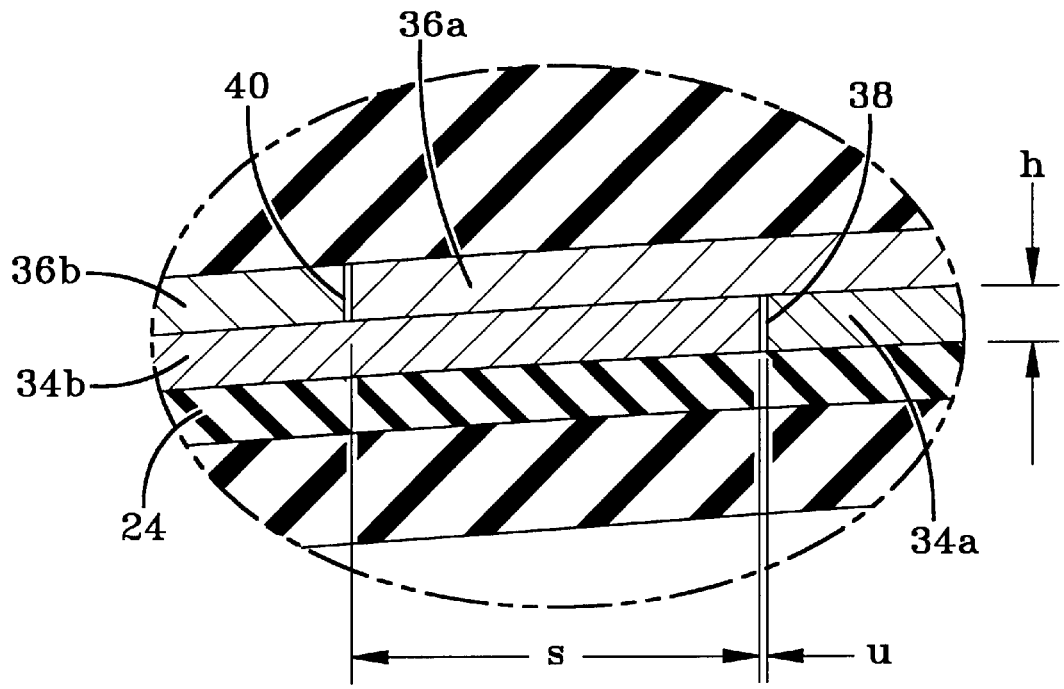
FIG. 1A is a close up cross-sectional view of the edges and overlap of the belt ply segments of the tire of FIG. 1.
Figure 1B:
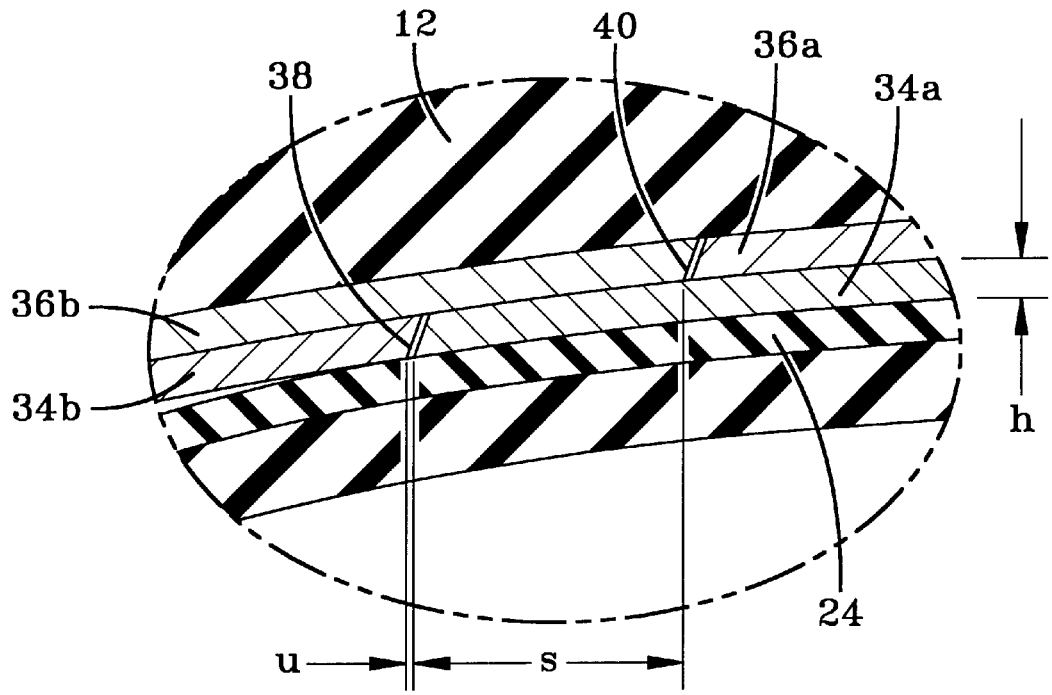
FIG. 1B is a close up cross-sectional view of the edges and overlap of an alternative belt structure.

For the illustrated tire 10, in constructing the belt structure 32, the central belt segments 34a, 36a and two belt edge segments 34b, 34b, 36b, 36b are laid next to each edge of the central belt segments 34a, 36a respectively. If the edges of the belt segments 34a, 36a, 34b, 36b are cut perpendicular to the belt ply surface, as seen in FIG. 1A, than the belt ply segments 34a, 36a, 34b, 36b are laid adjacent to one another with no overlap between the segments. Alternatively, the edges of the belt ply segments 34a, 36a, 34b, 36b may be skived at an angle with respect to the belt ply surface, as seen in FIG. 1B, than the complementary angles of the adjacent belt segments are matched up to form a belt ply 34, 36 that has no visible circumferential overlap or dual thickness of the belt at any portion of the belt.

FIG. 1A more clearly illustrates the region of the belt structure 32 where the belt plies 34, 36 are segmented, creating the hinge points 38, 40. The axial distance s between the hinge points 38, 40 of the inner ply 34 and the outer ply 36 is chosen to be greater than the radial distance h between the radially inner surface of adjacent plies 34, 36. The distance u between the edges of the belt ply segments 34a, 34b, 36a, 36b has a maximum width equal to the distance h between the radially inner surfaces of adjacent plies 34, 36, and a minimum width of zero. The tire 10 and different embodiments of the tire 10 are more fully disclosed in commonly assigned U.S. patent application 09/725,651, issued as U.S. Pat. No. 6,394,160 on May 28, 2002, and which is fully incorporated herein by reference.

The tire 10 is built in a two stage method. The components of the tire 10, the inner liner 35, the carcass ply 24, the beads 22, apex 28, and belt structure 32, are assembled on a tire building drum, forming a green tire. After assembly, the green tire is provided with a tread rubber and then placed into a mold for curing and formation of the tread 12 and any sidewall patterns or markings.

In assembling the green tire, application of the belt package is modified from the standard practice of applying a full width belt ply since each belt ply 34, 36 of the belt structure 32 is a plurality of belt ply segments 34a, 34b, 36a, 36b. As each belt ply 34, 36 is applied to the carcass 24 during building of the green tire, the belt ply 34, 36 is longitudinally cut to divide the continuous belt ply 34, 36 into the desired number of belt ply segments 34a, 34b, 36a, 36b. The belt ply segments 34a, 34b, 36a, 36b are then laid adjacent to one another as the belt structure 32 is built up to the desired number of belt plies.

Figure 2:
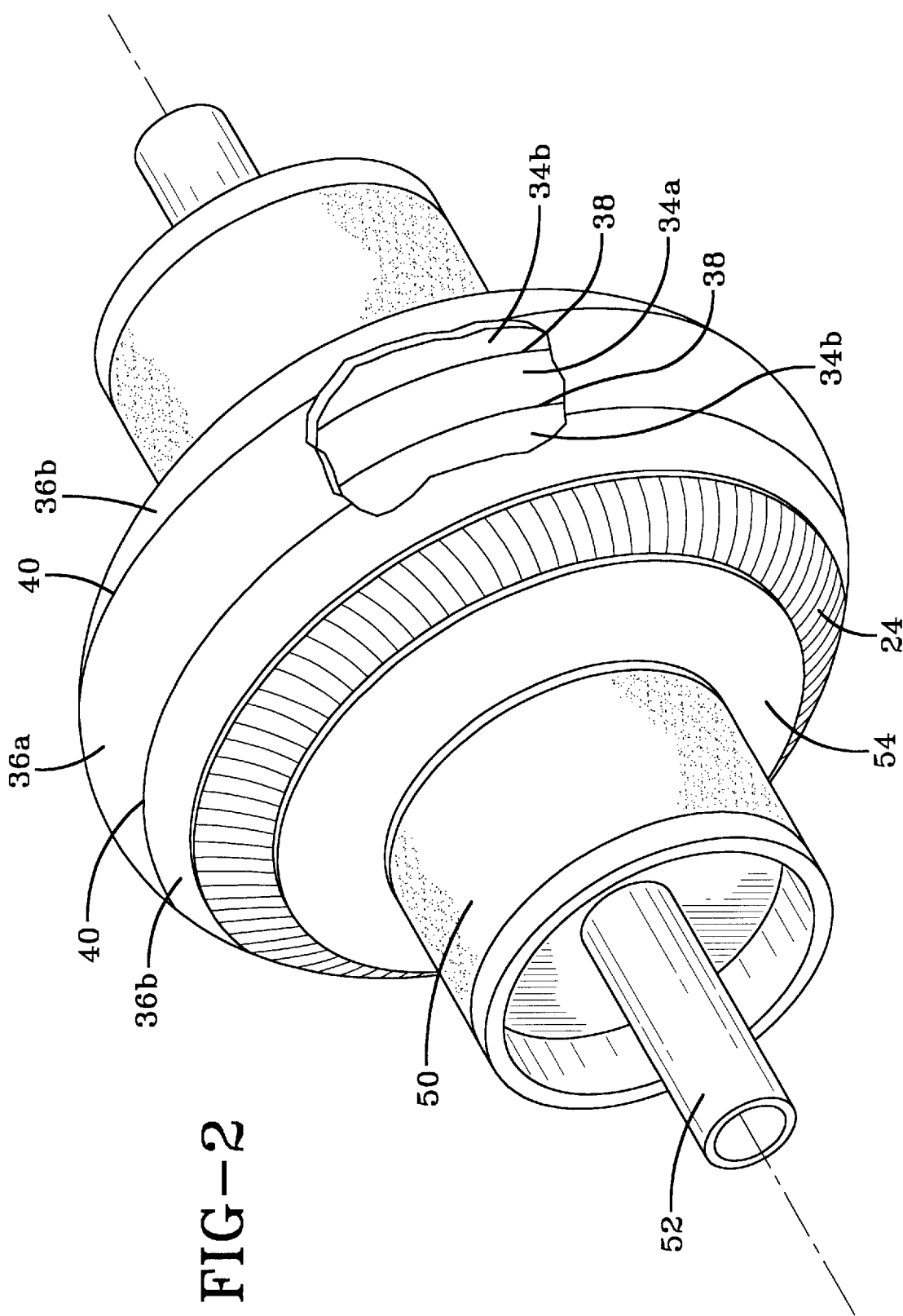
FIG. 2 is a green tire on an expanded building drum.

FIG. 2 illustrates a green tire mounted on a building drum 50. The building drum 50 rotates about the shaft 52. The building drum 50 is expanded, placing the green tire in a toroidal configuration. The carcass structure 24 has been applied and the ends turned up about bead cores (not illustrated). Sidewall covers 54 have been applied over the turn up ends. Belt ply segments 34a, 34b, 36a, 36b have been applied to the carcass ply 24 after the building drum 50 is expanded.

Figure 3:
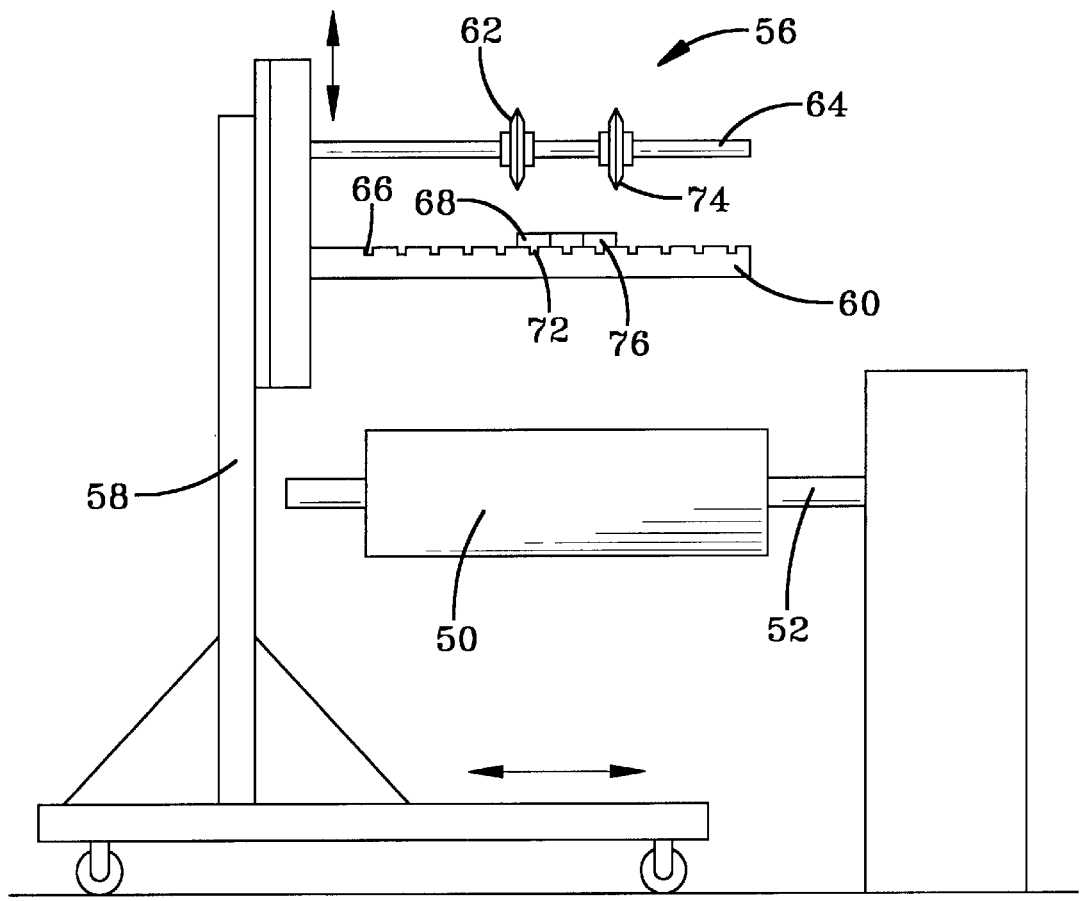
FIG. 3 illustrates the cutter positioned over the building drum.

FIG. 3 illustrates the building drum 50 with the inventive cutter 56. The cutter 56 is positioned in close proximity to the building drum 50. Typically, there is a cutter located adjacent to the building drum 50 so that the tire builder may splice the different components of the tire 10. However, the conventional cutter splices the materials in a direction parallel or at an angle relative to the longitudinal direction of the building drum 50.

To form the belt ply segments 34a, 34b, 36a, 36b, a continuous belt material must be spliced both longitudinal and perpendicular to the building drum 50. To maintain as small a spacing between the belt ply segments 34a, 34b, 36a, 36b, the perpendicular splicing is accomplished at the building drum 50. Splicing at the building drum 50 also ensures that the cord angles for all the belt ply segments in a single belt ply 34, 36 are inclined in the same direction.

The longitudinal cutter 56 is mounted on a stand 58 so that it may be in a fixed position relative to the building drum 50, or the stand 58 may be constructed so as to moveable wherein the cutter 56 may be readily removed from the building area or the area adjacent to the building drum 50 and out of the builder's way when not required.

The cutter 56 has two elements: a base receiving plate 60 and shear cutters 62. The receiving plate 60 has a width, parallel to the building drum 50, that is greater than the width of the belt ply to be cut by the transverse cutter 56. Above the receiving plate 60 is a rail 64 upon which are at least two shear cutters 62. The continuous belt ply passes over the receiving plate 60 and under the shear cutters 62. The belt ply is longitudinally cut by the shear cutter 62, and, after being cut, is laid upon the carcass ply 24 on the building drum 50. Each belt ply 34, 36 is successively cut and laid upon the building drum 50.

Figure 4:
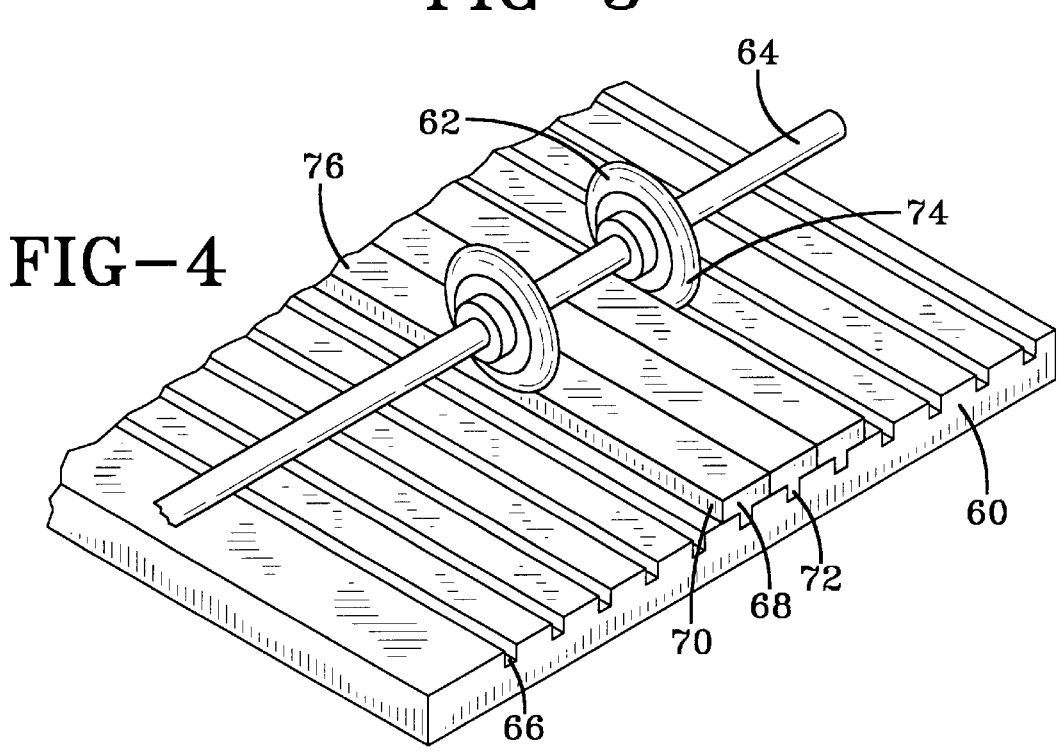
FIG. 4 is the base plate and skiving wheels of the cutter.

FIG. 4 is a transverse view of the base receiving plate 60 and the shear cutters 62. The base plate 60 has a series of grooves 66 extending along the plate 60. The grooves 66 are illustrated equally spaced across the width of the plate 60, but may be spaced differently depending upon the desired widths of the belt ply segments to be formed. Mounted in the grooves 66 are cutting bars 68, forming edges 70 against which the shear cutters 62 rotate to splice the continuous belt ply. Along the base of each cutting bar 68 is a tang 72 that fits within the grooves 66 in the base of the plate 60. When the grooves 66 are equally spaced across the width of the base plate 60, the bars 68 have a width that is at least ten percent of the width between the adjacent grooves 66. By selectively inserting bars 68, either of similar or different widths, in the receiving plate 60, the distance between the shear cutters 62 is determined, setting the distance between the splices of the belt ply.

Alternatively, a single cutting bar 68 may be provided with multiple tangs 72 along the base, the multiple tang bar having a width corresponding to the desired width of the belt ply segments. When splicing the belt ply into only three belt ply segments, a single cutting bar 68 with multiple tangs 72 would have a width equivalent to the center belt ply segment 34a or 36a.

In another example, if the belt ply is to have five belt ply segments, a central cutting bar 68 and two edge cutting bars 68 may be used. In such a situation, the portion of the belt ply which forms the intermediate belt ply segments travels directly over the base receiving plate 60 while the central portion of the belt ply and the edge portions of the belt ply travel over the cutting bars 68.

Since the space between the shear cutters 62 is determined by the width of the belt ply segments and the cutting bars 68, the shear cutters 62 are mounted on the rail 64 in such a manner as to be readily moved along the rail 64. Multiple cutters 62 are mounted on the rail 64, the number of cutters 62 corresponding to the number of splices to be made in the continuous belt ply. As the cutters 62 are mounted on the rail 64 in a moveable manner, more cutters 62 than are required for a tire specification may be mounted on the rail 64. The cutters 62 which are not required for a tire build specification may be moved to the ends of the rail 64 in a location wherein there is no contact with the belt ply being fed through the cutter 56.

The rail 64 upon which the cutters 62 are mounted is also, preferably, moveable relative to the base plate 60. In the operating position, the lowermost edge 74 of the cutters 62 is just below the top surface 76 of the cutting bars 68. To assist in feeding belt material through the cutter, the rail 64 is moveable relative to the cutting bars 68 and the base plate 60.

Additionally, to be able to cut the belt plies 34, 36 at an angle to result in slightly overlapping belt ply segments 34*a*, 34*b*, 36*a*, 36*b*, as seen in FIG. 1B, the cutters 62 are mounted on the rail 64 in such a manner as to allow the operator to set the cutting operation at an inclined angle. Because the rail 64 is adjustable relative to the base plate 60, to achieve the desired angle, the cutters 62 may cut against the top surface 76 of the bars 68.

For increased efficiencies in building the green tire with multiple segmented belt plies, and since the necessary belt ply materials are typically mounted on separate let off reels adjacent to the building drum, it may be desired to provide multiple longitudinal cutters adjacent to the building drum. The number of longitudinal cutters 56 is at least equal to the number of belt plies 34, 36 to be segmented when building the segmented belt ply tire 10.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of building a tire, the tire comprising at least one cord reinforced belt ply, the at least one cord reinforced belt ply comprising cords inclined with respect to the equatorial plane of the tire, wherein the method is comprised of layering tire components on a tire building drum, the method being characterized by:

longitudinally cutting the at least one belt ply prior to placing the at least one belt ply on the building drum to form a plurality of belt ply segments, placing the plurality of belt ply segments on the building drum so the cords in each belt ply segment of each belt ply are oriented in the same direction.

2. A method of building a tire in accordance with claim 1 wherein the method is further characterized by longitudinally cutting at least two belt plies to form a plurality of belt ply segments and placing the plurality of belt ply segments of each belt ply on the building drum so the cords in the belt ply segments of each belt ply are oriented in opposite directions relative to the belt ply segments of the adjacent belt plies.

3. A method of building a tire in accordance with claim 1 wherein the method is further characterized by cutting the at least one belt ply immediately prior to placing the at least one belt ply on the building drum.

4. In a method of building a tire, the tire comprising a carcass ply and at least one belt ply radially outward of the carcass ply, the improvement comprising:

supplying at least one cord reinforced belt ply, longitudinally cutting the at least one belt ply into a plurality of belt ply segments, placing the plurality of belt ply segments on a tire building drum in a single revolution of the building drum so that the cords in each belt ply segment of each belt ply are oriented in the same direction.

5. A method of building a tire in accordance with claim 4 wherein said at least one cord reinforced belt ply is at least two cord reinforced belt plies and the method is further comprised by longitudinally cutting said at least two belt plies to form a plurality of belt ply segments and placing the plurality of belt ply segments of each belt ply on the building drum so the cords in the belt ply segments of each belt ply are oriented in opposite directions relative to the belt ply segments of the adjacent belt plies.

6. A method of building a tire in accordance with claim 4 wherein the method is further comprised by cutting the at least one cord reinforced belt ply immediately prior to placing the at least one belt ply on the building drum.

* * * * *